(12) United States Patent
Gryting et al.

(10) Patent No.: US 11,386,219 B2
(45) Date of Patent: Jul. 12, 2022

(54) DETECTION OF AN UNAUTHORIZED MODIFICATION TO STORAGE AND RESTORATION OF THE STORAGE

(71) Applicant: Raytheon Company, Waltham, MA (US)

(72) Inventors: Paul Gryting, Helotes, TX (US); Cody L. Tankersley, Owens Cross Roads, AL (US); Christopher Browning, Madison, AL (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/000,474

(22) Filed: Aug. 24, 2020

(65) Prior Publication Data

US 2022/0058281 A1   Feb. 24, 2022

(51) Int. Cl.
| | |
|---|---|
| *G06F 21/62* | (2013.01) |
| *G06F 11/14* | (2006.01) |
| *G06F 11/30* | (2006.01) |
| *G06F 21/64* | (2013.01) |
| *G06F 21/74* | (2013.01) |
| *G06F 21/60* | (2013.01) |

(52) U.S. Cl.
CPC ...... *G06F 21/6218* (2013.01); *G06F 11/1451* (2013.01); *G06F 11/3034* (2013.01); *G06F 21/602* (2013.01); *G06F 21/64* (2013.01); *G06F 21/74* (2013.01); *G06F 2221/2147* (2013.01)

(58) Field of Classification Search
CPC .. G06F 21/6218; G06F 11/1451; G06F 21/64; G06F 21/74; G06F 11/3034; G06F 21/602; G06F 2221/2147
See application file for complete search history.

(56) References Cited

U.S. PATENT DOCUMENTS

| | | | |
|---|---|---|---|
| 6,449,731 B1 | 9/2002 | Frey, Jr. | |
| 7,523,343 B2 | 4/2009 | Leis et al. | |
| 7,694,191 B1 | 4/2010 | Bono et al. | |
| 9,727,424 B2* | 8/2017 | Johnson, III | ............ G06F 11/00 |
| 2004/0210796 A1* | 10/2004 | Largman | ............ G06F 11/1469 |
| | | | 714/E11.133 |
| 2008/0162915 A1 | 7/2008 | Price et al. | |
| 2010/0306826 A1* | 12/2010 | Kestner | ................ G06F 21/554 |
| | | | 711/E12.001 |
| 2016/0019122 A1* | 1/2016 | Johnson, III | ........ G06F 11/3055 |
| | | | 714/19 |
| 2018/0069749 A1* | 3/2018 | Singhal | ............... H04L 41/0681 |
| 2018/0373900 A1* | 12/2018 | Barlow | ................ H04L 9/3242 |

* cited by examiner

*Primary Examiner* — Abiy Getachew
(74) *Attorney, Agent, or Firm* — Daly, Crowley, Mofford & Durkee, LLP

(57) ABSTRACT

An aspect includes monitoring storage of a computer system. Upon detecting an unauthorized modification to an original storage component in response to the monitoring, an aspect includes retrieving a backup component corresponding to the original storage component and repairing the original storage component using the backup component. In embodiments, the repair occurs in real-time without interruption to computer operation.

12 Claims, 6 Drawing Sheets

US 11,386,219 B2

DETECTION OF AN UNAUTHORIZED MODIFICATION TO STORAGE AND RESTORATION OF THE STORAGE

TECHNICAL FIELD

The disclosure relates generally to data security, and more particularly, to restoration of modified data in a storage system.

BACKGROUND

In computer systems, certain types of files (e.g., those designated as essential to the performance of a computer system) can be corrupted or altered rendering the system unusable or unable to complete a specified mission. While some solutions have been able to provide detection of a corrupted or altered file, these solutions typically provide only the reporting of the events to a system administrator for subsequent remedial action to be taken.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method. The method includes monitoring storage of a computer system. Upon detecting an unauthorized modification to an original storage component in response to the monitoring, the method includes retrieving a secure backup component corresponding to the original storage component and repairing the original storage component using the backup component.

Another aspect may provide a system including a memory having computer-executable instructions and a processor executing the computer-executable instructions. The computer-executable instructions when executed by the processor cause the processor to perform operations. The operations include monitoring storage of a computer system. Upon detecting an unauthorized modification to an original storage component in response to the monitoring, the operations include retrieving a secure backup component corresponding to the original storage component and repairing the original storage component using the backup component.

Another aspect may provide a computer program product embodied on a non-transitory computer readable medium, the computer program product including instructions that, when executed by a computer, causes the computer to perform operations. The operations include monitoring storage of a computer system. Upon detecting an unauthorized modification to an original storage component in response to the monitoring, the operations include retrieving a secure backup component corresponding to the original storage component and repairing the original storage component using the backup component.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

As indicated above, storage components, such as memory units and critical files can be corrupted or altered (e.g., through malicious attack) rendering a system unusable or unable to complete a specified mission. Embodiments described herein provide techniques for self-healing memory and files in which its original contents are restored in the event of unauthorized modifications. This restoration occurs in near real time as the system is operating and without interruption to the system or its mission.

In embodiments, a solution for self-healing files and memory are provided. The techniques described herein provide a way to protect a file by recording file characteristics in a database creating secure encrypted backup copies of self-healing files, and protecting the backup files from deletion or modification. File characteristics, in this scenario, refers to the entire file. In embodiments, a 'secure backup' is made. A few items can be tracked. For example, a hash of the file can be tracked so that one can easily identify when the files do not match, and the backup file itself is encrypted. Techniques can further include intercepting file system access and redirecting program control to a kernel driver, authenticating data by a kernel against recorded hash values stored in a database, retrieving data from the secure backup, and writing corrected data back to a damaged/modified file. The techniques provide a mechanism for protecting files with a healing attribute (e.g., a file marking or identifier), recording characteristics of the file in a database, and making a secure encrypted backup copy of the files while obfuscating the file names to confuse attackers.

In some embodiments, the techniques include monitoring activity on files in real time while authenticating the data read from the file against recorded hash values from the database, detecting when file data has been modified and authenticating backup data, and restoring altered file data from the backup copies in real time and without interruption to system operation. These, and other features, of the embodiments will be described further herein.

Modern computing systems generally segregate virtual memory into a kernel space and one or more user spaces. This segregation may be performed in order to provide hardware and memory protection from malicious or inadvertent software events.

Figure 1:
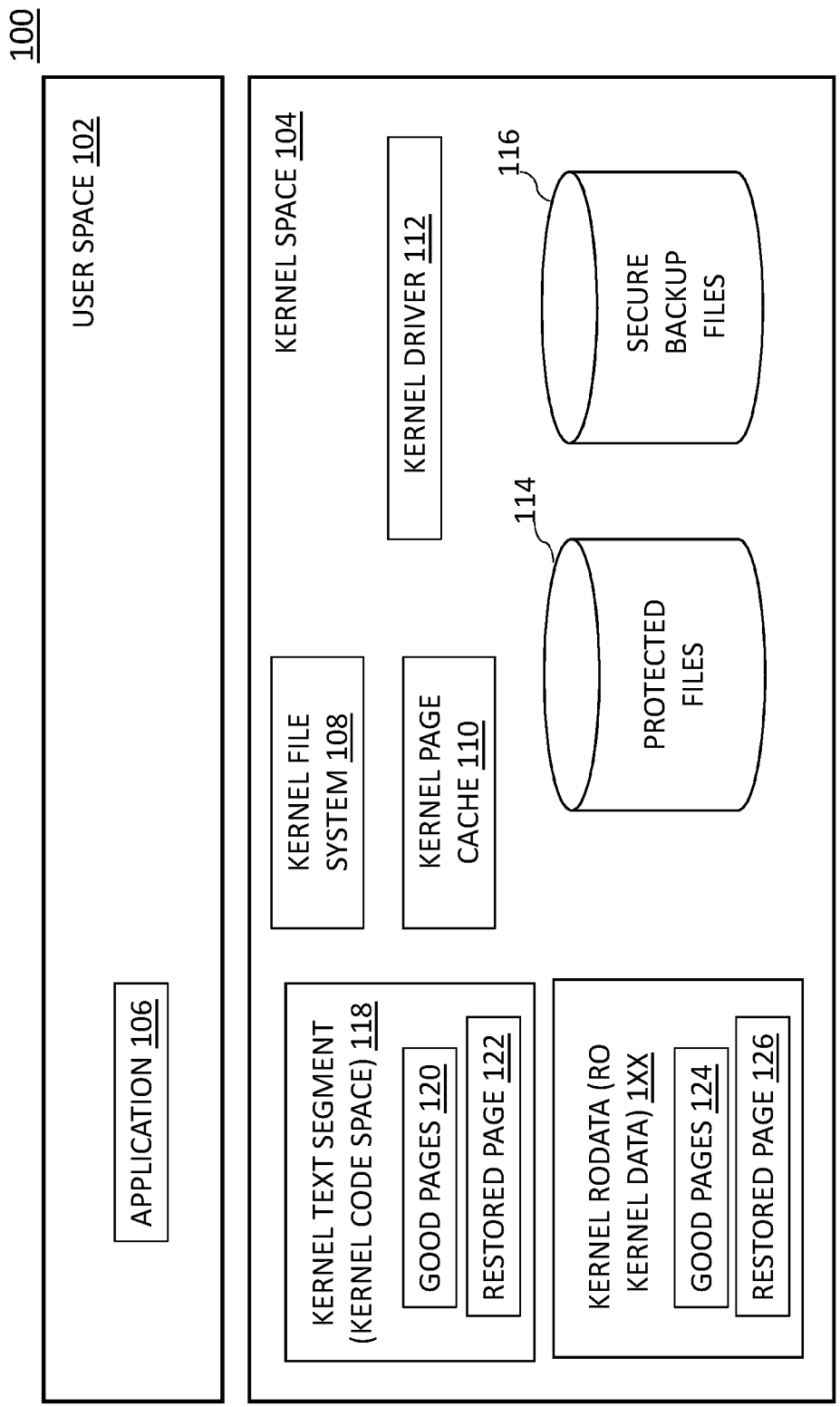
FIG. 1 is a block diagram of a portion of a system upon which detection of an unauthorized modification to storage in a storage system and restoration of the modified storage may be implemented in accordance with an embodiment.

Turning now to FIG. 1, a portion of a system upon which the modification detection and restoration processes may be implemented will now be described with respect to a virtual memory 100. The virtual memory 100 may form part of a system that includes hardware and software components, which is described more particularly in FIG. 5 herein. As shown in the virtual memory 100 of FIG. 1, a kernel space 104 is allocated for running a privileged operating system kernel, kernel extensions, and device drivers, such as a kernel space device driver 112 (also referred to as "kernel driver"). Applications, such as application 106, execute within the user spaces, such as user space 102. The kernel driver 112 is configured to manage activities that occur in the kernel space. Commands from the application 106 in the user space 102 may be passed from the user space 102 to the kernel space 104 and traverse a kernel stack (not shown) before retrieval by a storage device. The application 106 communicates with one or more storage elements through the kernel driver 112.

A kernel file system 108 controls how data is stored and retrieved in a computer system, e.g., separating the data into logically addressable units, such as pages, files, etc.

Kernel page cache 110 resides in the kernel space 104 and is accessed by kernel driver 112 to provide files or pages in response to requests from the application 106.

The detection and restoration processes monitor storage components to determine whether any of the components have been modified (e.g., through malicious corruption from an external source or through an error). The monitoring includes intercepting system calls to the kernel space 104. The system calls may include requests from the application 106 for access to files. It is desirable to monitor system calls as they are often used to access sensitive components of the operating system that are controlled by the kernel (e.g., the kernel file system 108), shared memory, and network connections.

As shown in FIG. 1, a database 114 stores protected files and a database 116 stores secure backup files (also referred to as encrypted backup files). The databases 114 and 116 may be stored in non-volatile storage, e.g., on a hard disk. These files will be described further herein.

The virtual memory 100 also includes a kernel text segment (kernel code space) 118 which, in turn, includes good pages 120 and restored page 122. Additionally, the memory 100 includes a kernel read only data space (RO-DATA) 124 that in turn includes good pages 126 and restored page 128. In embodiments, the kernel text segment 118 represents the executable code of the kernel. .text or Text Segments in binaries represent the code that the processor should execute. In some embodiments, kernel space is no different from user space and has a .text segment which is the code that will execute and 'run' the kernel. The Read Only Data or rodata/RODATA is the data that a binary has stored with it to reference. In embodiments, this is constant data such as a string that the program uses. For example, imagine running an application and when it starts, it prints "Account Manager 9000", that string would be stored in the data section of the binary. The kernel is no different. It also has read only data that is stored with its binaries upon creation. In the case of the kernel, instead of string data it may be more of configuration options that were used to set parameters of the kernel upon build time. So-called good pages are pages that are trusted. When comparing the hash of a 'good' page, one obtains the same hash as the one that was stored. This means the page has not been altered and thus is good or trusted. Restored pages are replacement pages for bad pages. A page would be "bad" when a compared hash does not match the hash that was stored. If the hash does not match, one over writes the bad page with the backup and it becomes a 'Restored Page'.

Figure 2:
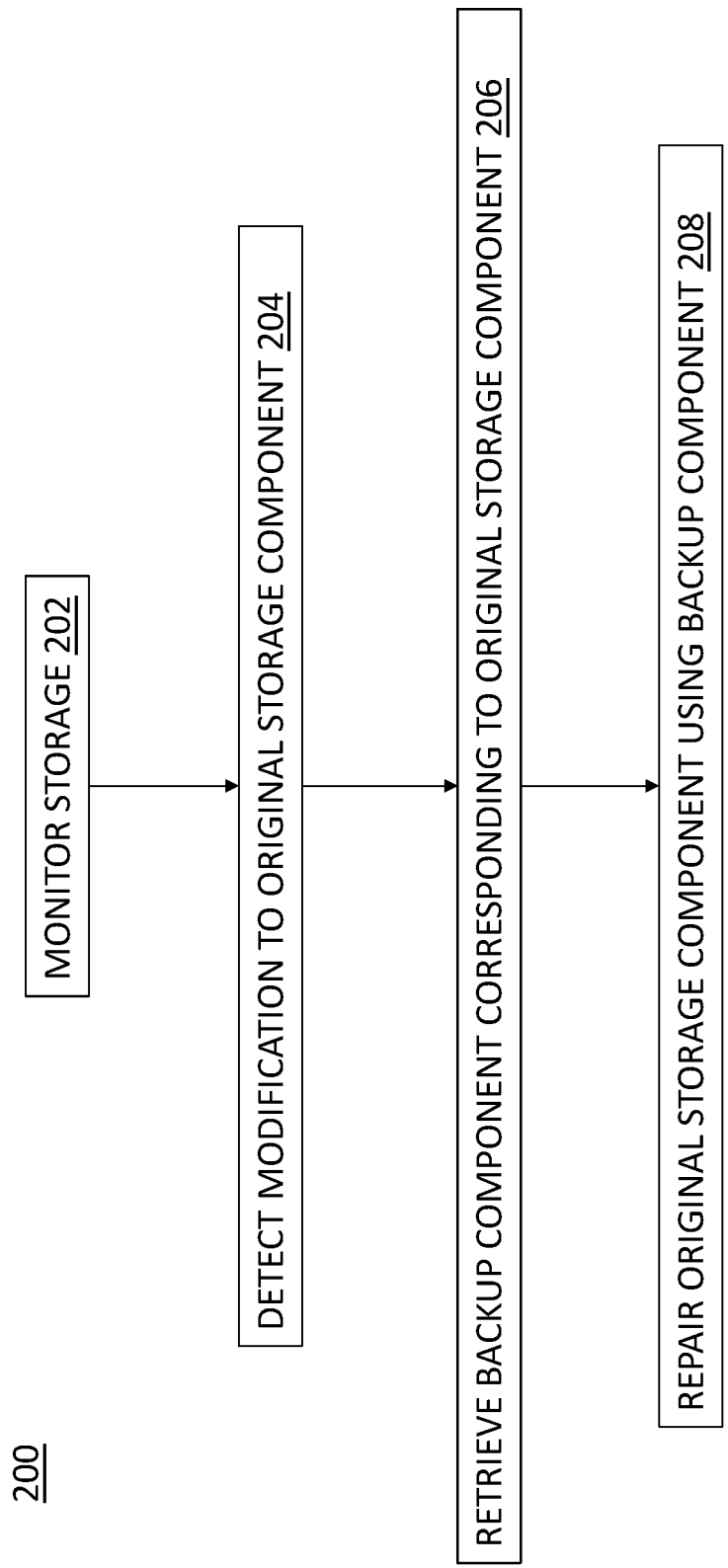
FIG. 2 is a flow diagram of a high-level view of a process for detection of the unauthorized modification to the storage and restoration of the modified storage in accordance with an embodiment.

Turning now to FIG. 2 a high-level process 200 for implementing detection and restoration processes will now be described. In block 202, the process 200 monitors storage associated with virtual memory 100. The storage may be protected files (from database 114) or a memory unit 118/124. As discussed above, in some embodiments, the monitoring may include intercepting system calls to the kernel space 104. The system calls may include requests from the application 106 for access to files.

In block 204, the process 200 determines, in response to the monitoring, whether modification to an original storage component of the storage has occurred. An original storage component may be a protected file from database 114 or one or more pages 120/126.

If no modification has been detected, the process 200 continues to monitor the storage in block 202. Alternatively, if the monitoring reveals that a file has been requested and it has not been modified, the process 200 returns the file to the requester.

However, if a modification has been detected in block 204, the process 200 retrieves a backup component (e.g., a secure back file from database 116 or a stored page 122/128) that corresponds to the original storage component in block 206. In block 208, the process 200 repairs the original storage component using the backup component. Yes. Retrieve backup component corresponding to original storage component 206.

Figure 3:
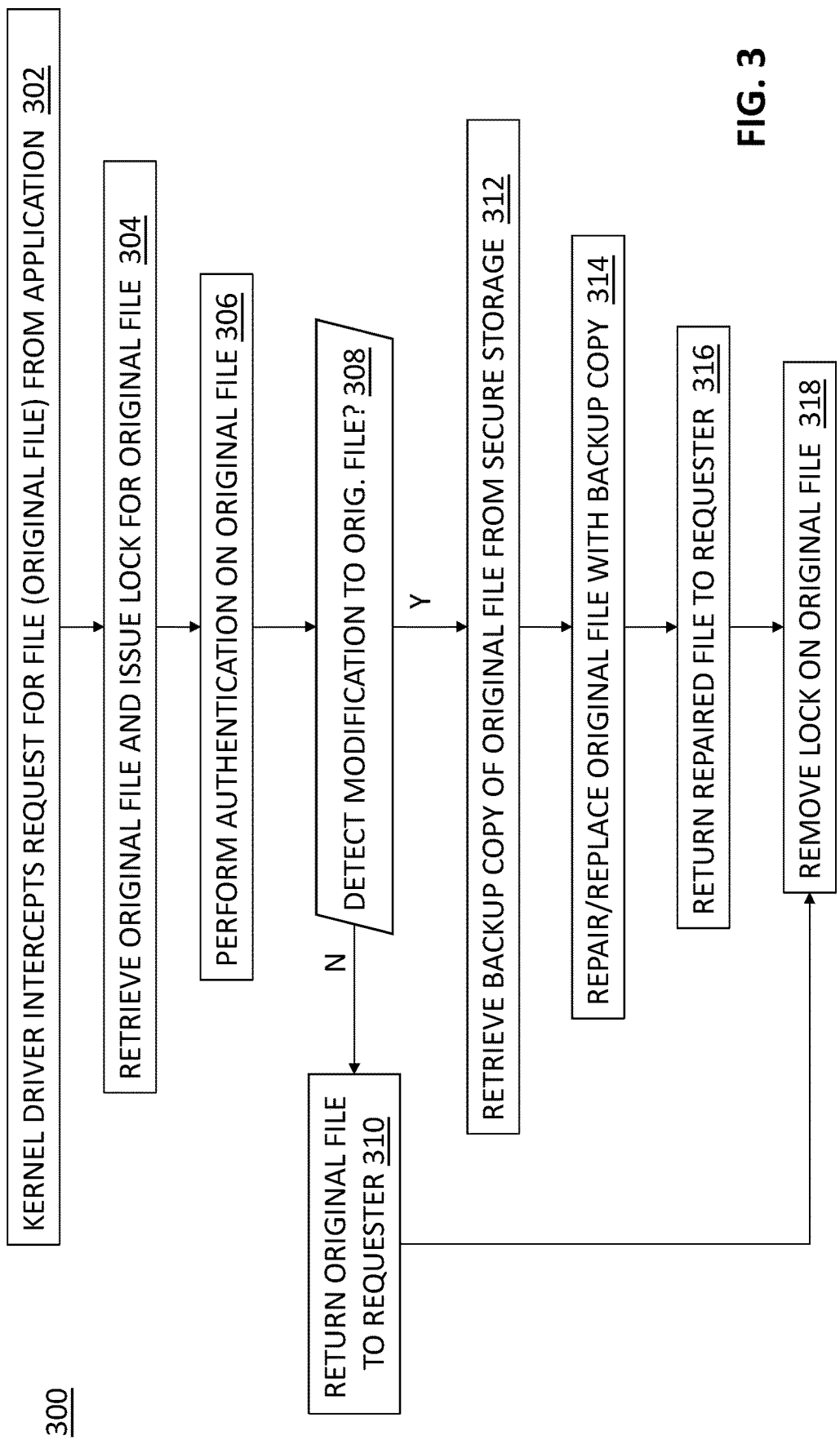
FIG. 3 is a flow diagram of a process for detection of the unauthorized modification to a data file in a storage system and restoration of the modified data file in accordance with an embodiment.

As indicated above in FIG. 2, the storage that is monitored may be protected files (e.g., from database 114). Files may be designated as "protected" by a user and the designation can be provisioned by software. Turning now to FIG. 3, a process 300 for implementing the detection and restoration functions with respect to protected files will now be described. In FIG. 3, the process 300 assumes that a request (e.g., from application 106) for access to one of the protected files has been issued, e.g., via a system call. The request may be issued to the kernel file system 108.

In block 302, the kernel driver 112 intercepts the request for the file. The file is referred to herein as "original file" to distinguish it from backup copies of files that are maintained by the process 300.

In block 304, the kernel driver 112 retrieves the original file and issues a lock for the file. In block 306, the process 300 performs authentication on the original file. In embodiments, as part of step 202 (monitoring) in FIG. 2, the system monitors for requests/calls from applications for file access and may perform steps 302 and 304 assuming such a request has been seen during monitoring followed by step 306. Hash values of original files are stored for use in performing authentication. In an embodiment, the authentication is performed responsive to issuing the lock on the file and includes verifying a hash value of the file against a database of hash values corresponding to the encrypted backup copies of the files. Thus, when the hash value of the file does not match any of the hash values of the encrypted backup copies, the file is determined to have been modified. In an embodiment, the authentication is performed using keyed-hash message authentication code (HMAC). In an embodiment, authentication is performed using keyed-hash message authentication code (HMAC) including verifying integrity of the encrypted backup copy of the file prior to repairing the original storage component using the encrypted backup copy of the file.

In block 308, the process 300 determines from the authentication whether a modification to the original file has occurred. If not, the original file is returned to the requester in block 310 and the lock on the original file is removed in block 318.

However, if a modification to the original file has occurred, the process 300 retrieves a corresponding backup copy of the original file from database 116 in block 312. The backup copies of original files are encrypted prior to storage in the database 116.

In block 314, the process 300 repairs the original file with correct data from the backup copy and the corrected file is returned to the requester in block 316. In block 318, the lock is removed by the process 300.

The detection and restoration processes may provide an event log that records each incidence of a modified file that has been corrected via the process 300. This event log may be made available to a system administrator or other authorized entity for tracking these events.

It will be understood that the authenticating and repairing may be performed at a more granular level than at a file level. For instance, during authentication of a file, when a modification is determined to have occurred for a portion of a file (e.g., a page), the process 300 may access corrected data for a corresponding portion of the file in the encrypted backup copies database and repair the original file at the location of the modification. In embodiments, the process to identify the particular page or portion from the requested file is dependent on the operation. Whenever a user space application is created, shutdown, or needs to make a call into the kernel, it follows a specific and unique path. If one an understanding of the "internals' of an operating system, one can identify all of these locations. Upon identifying the location, one can perform a so-called 'hook'. This is when one overwrite part of the software with one's own software (at runtime). Instead of following that distinct path, the code that is running will be diverted to our code. Given the knowledge of where the hook was performed and what data the kernel expects to receive on this path, one can now analyze the data with 100% accuracy and know what type of data it is. Using that knowledge, one can identify what is needed from the database.

In embodiments, the detection and restoration processes include provisioning the databases 114 and 116 for implementing the process 300 of FIG. 3. The provisioning includes marking selected files in the database 114 with an identifier reflecting that the marked files are to be encrypted and authenticated upon access via an application, encrypting the selected files marked with the identifier via a hashing technique, and storing the encrypted files in the database 116. The identifiers/names of these encrypted files may be obfuscated in order to prevent identification and access by unauthorized sources.

Figure 4:
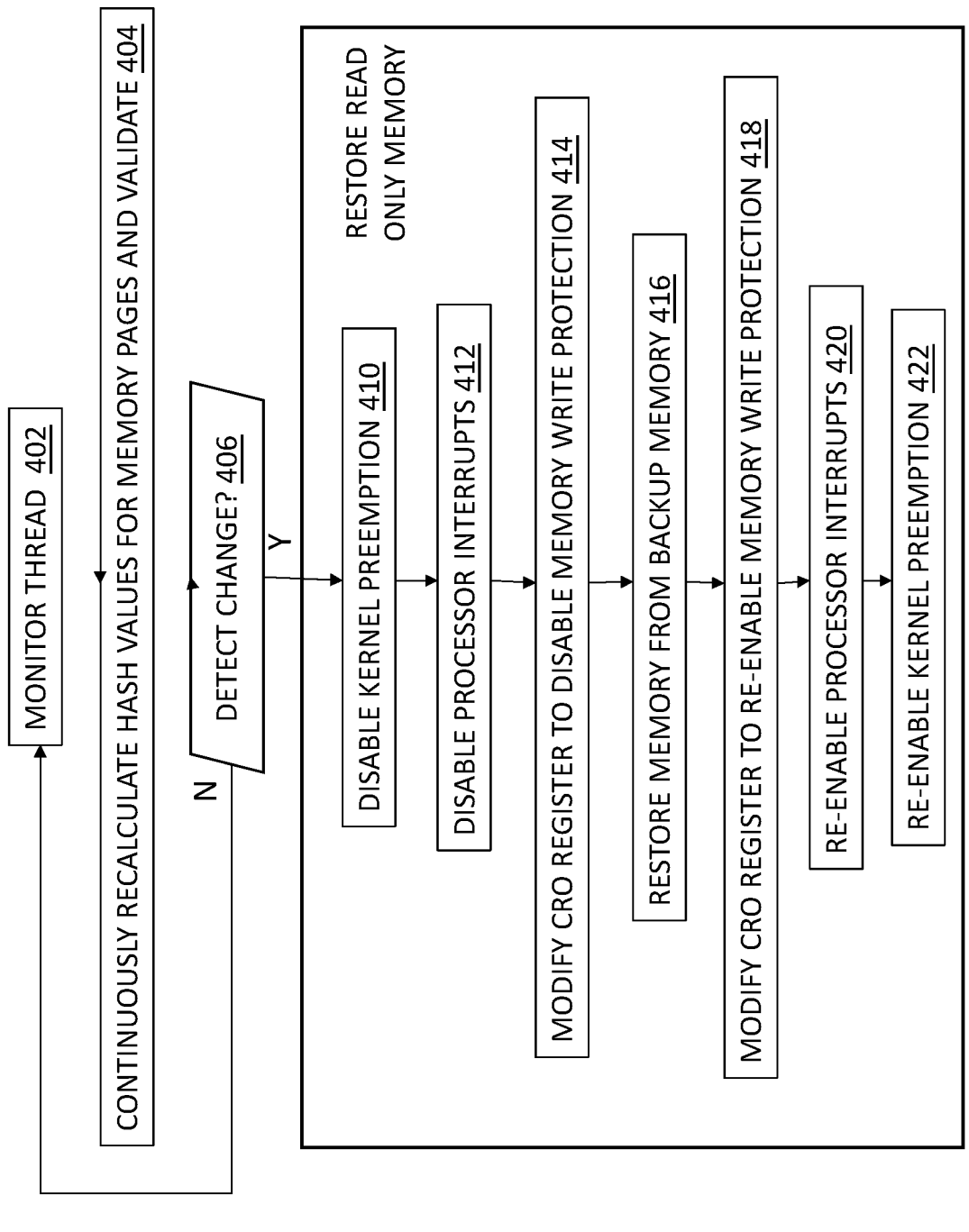
FIG. 4 is a flow diagram of a process for detection of an unauthorized modification to a memory unit and restoration of the modified memory unit in accordance with an embodiment.

As indicated above, in addition to monitoring file modifications, the detection and restoration processes may also monitor memory units of a computer system (e.g., where the storage component of FIG. 2 is a memory unit). Turning now to FIG. 4, a process 400 for implementing detection and restoration functions with respect to memory units of a computer system will now be described.

In block 402, the process 400 includes monitoring a thread corresponding to the memory unit. In block 404, the process 400 continuously recalculates hash values for memory pages of the memory unit and validates the hash values. If no changes are detected to the hash values in block 406, the process 400 continues the monitoring. In response to determining a modification to one of the hash values for a memory unit in block 406, the process restores the memory unit as described in blocks 410-422.

Restoring the memory unit includes disabling kernel preemption in block 410, disabling processor interrupts in block 412, modifying a CR0 register to disable memory write protection in block 414, and restoring the memory unit from backup memory in block 416. Register. In embodiments, a CR0 register refers to the control register which is used to control the state of the processor. Specifically, one of the items it handles is system interrupts. When the operating system switches context from user to kernel space, it will fire an interrupt to make that transition.

Once the memory unit has been restored, the process 400 includes modifying the CR0 register to re-enable memory write protection in block 418, re-enable the processor interrupts 420, and re-enable the kernel preemption in block 422.

Figure 5:
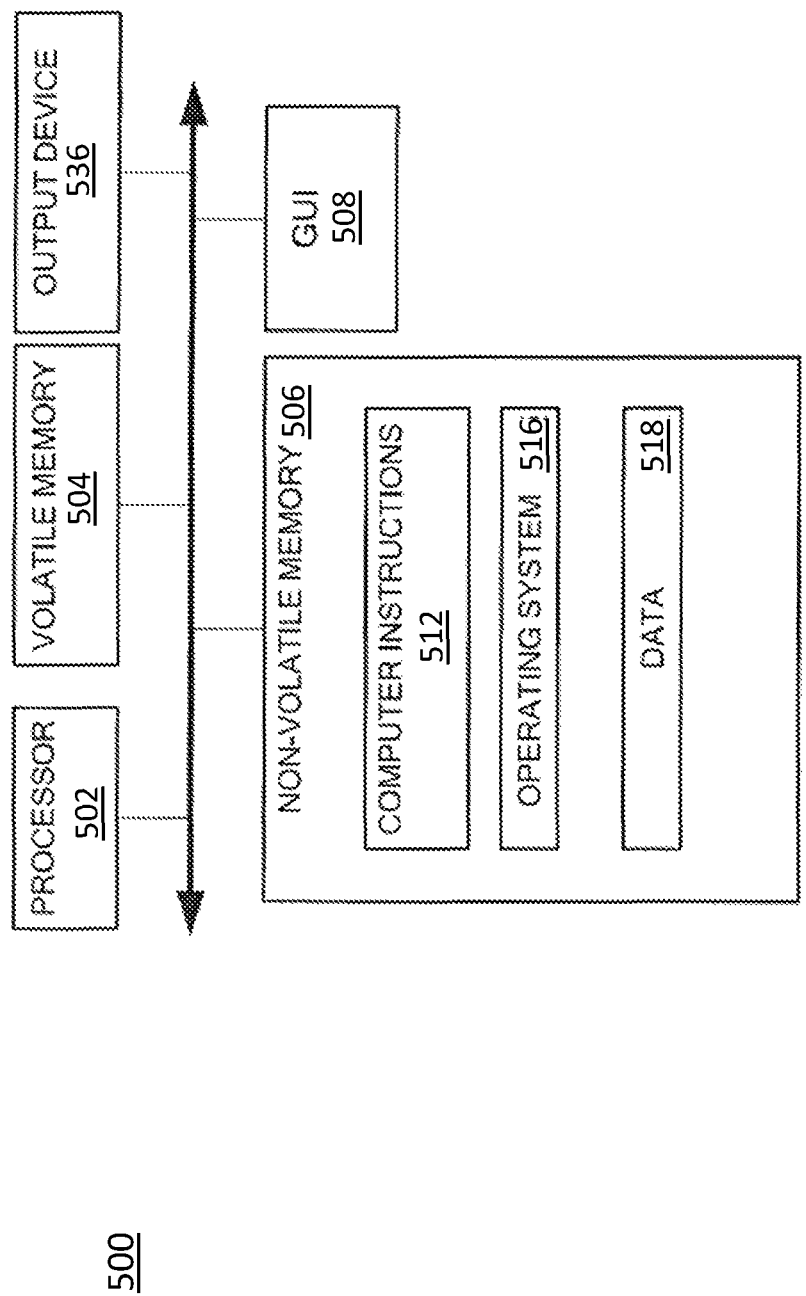
FIG. 5 is a block diagram of a hardware device that may perform the detection and restoration processes in accordance with an embodiment.

Referring to FIG. 5, a computer 500 for implementing the detection and restoration processes may include processor 502, volatile memory 504 (e.g., RAM), non-volatile memory 506 (e.g., a hard disk drive, solid state drive such as a flash drive, a hybrid magnetic and solid state drive, etc.), graphical user interface (GUI) 508 (e.g., a mouse, a keyboard, a display, and so forth) and input/output (I/O) device (not shown). Non-volatile memory 506 stores computer instructions 512, an operating system 516 and data 518 such that, for example, the computer instructions 512 are executed by the processor 502 out of volatile memory 504 to perform at least a portion of the processes 200-400 shown in FIGS. 2-4. Program code may be applied to data entered using an input device of GUI 508 or received from the I/O device. In an embodiment, the processor 502 may be configured to execute instructions 512 which may be one example of user space application 102 or device driver 112.

Processes 200-400 shown in FIGS. 2-4 are not limited for use with the hardware and software of FIGS. 1 and 5 and may find applicability in any computing or processing environment and with any type of machine or set of machines that is capable of running a computer program. Processes 200-400 shown in FIGS. 2-4 may be implemented in hardware, software, or a combination of the two.

The processes described herein are not limited to the specific embodiments described. For example, processes 200-400 are not limited to the specific processing order shown in FIGS. 2-4e. Rather, any of the blocks of processes 200-400 may be re-ordered, combined or removed, performed in parallel or in serial, as necessary, to achieve the results set forth herein.

Processor 502 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow charts of FIGS. 2-4, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 6:
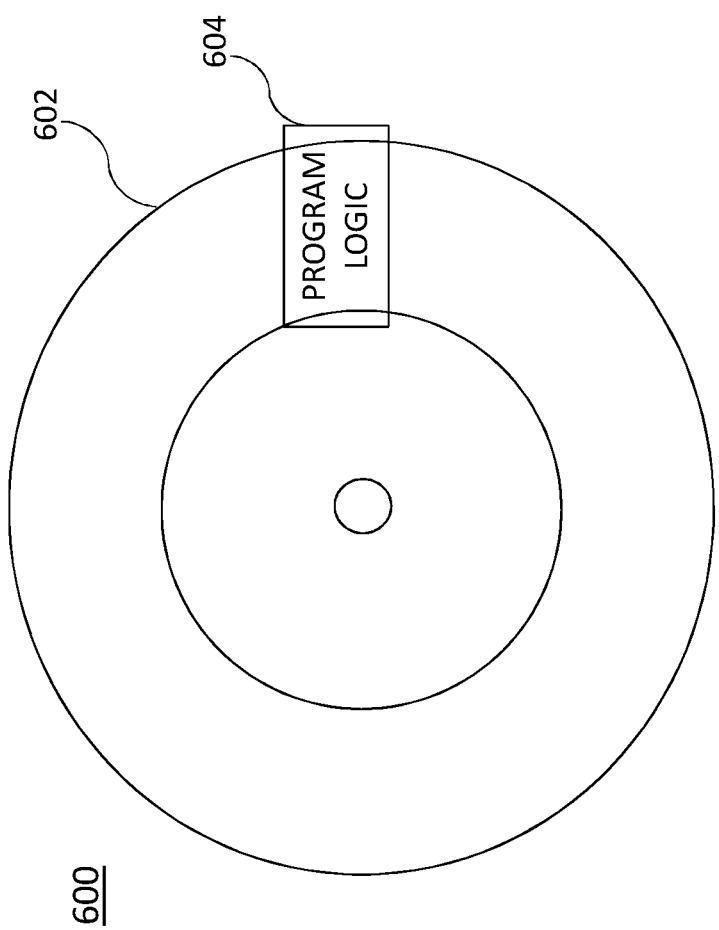
FIG. 6 is a simplified block diagram of an apparatus that may be used to implement at least a portion of the systems of FIGS. 1 and 5 and at least a portion of the processes of FIGS. 2-4 in accordance with an embodiment.

For example, when the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 6 shows Program Logic 604 embodied on a computer-readable medium 602 as shown, and wherein the Logic is encoded in computer-executable code configured for carrying out the reservation service process of this invention and thereby forming a Computer Program Product 600. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

What is claimed is:

1. A method comprising:
   monitoring a memory unit of a computer system, the monitoring includes monitoring a thread corresponding to the memory unit;
   recalculating hash values for memory pages of the memory unit and validating the hash values; and
   upon detecting a modification to a hash value for the memory unit:
      retrieving a secure backup copy corresponding to the memory unit;
      issuing a lock on the memory unit;
      restoring the memory unit using the secure backup copy; and
      removing the lock on the memory unit.

2. The method of claim 1, wherein the repairing the memory unit further comprises:
   disabling a kernel preemption and processor interrupts;
   modifying a read only register to disable write protection; and
   in response to completion of the repairing, modify the read only register to re-enable the memory write protection, re-enable the processor interrupts, and re-enable the kernel preemption.

3. A system comprising:
   a memory comprising computer-executable instructions; and
   a processor executing the computer-executable instructions, the computer-executable instructions when executed by the processor cause the processor to perform operations comprising:
      intercepting, by a kernel driver of a system, a request for an original file of the system;
      retrieving the original file and issuing a lock on the original file;
      performing authentication on the original file;
      upon detecting an unauthorized modification to the original file in response to the authentication:
         retrieving a secure backup copy corresponding to the original file, the secure backup copy being an encrypted backup copy of the original file;
         repairing the original file using the secure backup copy; and
         returning the repaired original file to a requester of the original file; and
      removing the lock on the original file.

4. The system of claim 3, wherein the operations further comprise provisioning a database files stored in the system, the database of files including the original file, the provisioning comprising:
   marking selected ones of the files with an identifier;
   encrypting the selected ones of the files marked with the identifier via a hashing technique; and
   storing the encrypted files in another database.

5. The system of claim 4, wherein the operations further comprise:
   obfuscating identifiers of each of the encrypted files.

6. The system of claim 4, wherein the detecting the unauthorized modification to the original file includes verifying a hash value of the original file against a database of hash values corresponding to the encrypted backup copies of the files; and
   wherein when the hash value of the original file does not match any of the hash values of the encrypted backup copies, the original file is determined to be modified.

7. The system of claim 6, wherein the authentication is performed using keyed-hash message authentication code (HMAC); and
   wherein the method further comprises verifying integrity of the encrypted backup copy of the original file prior to repairing the original file using the encrypted backup copy of the original file.

8. A method comprising:
   intercepting, by a kernel driver of a computer system, a request for an original file of the computer system;
   retrieving the original file and issuing a lock on the original file;
   performing authentication on the original file;
   upon detecting an unauthorized modification to the original file in response to the authentication:
      retrieving a secure backup copy corresponding to the original file, the secure backup copy being an encrypted backup copy of the original file;
      repairing the original file using the secure backup copy; and
      returning the repaired original file to a requester of the original file; and
   removing the lock on the original file.

9. The method of claim 8, further comprising provisioning a database files stored in the computer system, the database of files including the original file, the provisioning comprising:
   marking selected ones of the files with an identifier;
   encrypting the selected ones of the files marked with the identifier via a hashing technique; and
   storing the encrypted files in another database.

10. The method of claim 9, further comprising:
obfuscating identifiers of each of the encrypted files.

11. The method of claim 9, wherein the detecting the unauthorized modification to the original file includes verifying a hash value of the file against a database of hash values corresponding to the encrypted backup copies of the files; and
  wherein when the hash value of the original file does not match any of the hash values of the encrypted backup copies, the original file is determined to be modified.

12. The method of claim 11, wherein the authentication is performed using keyed-hash message authentication code (HMAC); and
  wherein the method further comprises verifying integrity of the encrypted backup copy of the original file prior to repairing the original file using the encrypted backup copy of the original file.

\* \* \* \* \*